United States Patent
Dhull et al.

(10) Patent No.: US 11,646,576 B2
(45) Date of Patent: May 9, 2023

(54) ELECTRICAL OVERSTRESS PROTECTION OF MICROELECTROMECHANICAL SYSTEMS

(71) Applicant: Analog Devices International Unlimited Company, Limerick (IE)

(72) Inventors: Naveen Dhull, Limerick (IE); Padraig L. Fitzgerald, Mallow (IE); Srivatsan Parthasarathy, Acton, MA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 17/447,096

(22) Filed: Sep. 8, 2021

(65) Prior Publication Data

US 2023/0075105 A1 Mar. 9, 2023

(51) Int. Cl.
*H02H 9/04* (2006.01)

(52) U.S. Cl.
CPC ..................... *H02H 9/04* (2013.01)

(58) Field of Classification Search
CPC ....................................... H02H 9/04
USPC .......................................... 361/54
See application file for complete search history.

(56) References Cited

U.S. PATENT DOCUMENTS

| | | |
|---|---|---|
| 6,465,856 B2 | 10/2002 | Gulvin et al. |
| 7,224,949 B2 | 5/2007 | Kluge et al. |
| 7,405,861 B2 | 7/2008 | Floyd |
| 7,522,394 B2 | 4/2009 | Khorram |
| 7,679,872 B2 | 3/2010 | Kawa et al. |
| 8,600,519 B2 | 12/2013 | Stevenson et al. |
| 8,654,489 B2 | 2/2014 | Farbarik et al. |
| 8,942,644 B2 | 1/2015 | Schell |
| 8,958,187 B2 | 2/2015 | Parthasarathy et al. |
| 9,002,297 B2 | 4/2015 | Chen et al. |
| 9,076,807 B2 | 7/2015 | Parthasarathy et al. |
| 9,190,699 B2 | 11/2015 | Granger-jones et al. |
| 9,337,653 B2 | 5/2016 | Brodsky et al. |
| 9,831,666 B2 | 11/2017 | Parthasarathy et al. |
| 9,954,356 B2 | 4/2018 | Parthasarathy et al. |

(Continued)

FOREIGN PATENT DOCUMENTS

| | | | | |
|---|---|---|---|---|
| CN | 101218654 A | * | 7/2008 | ......... H01H 59/0009 |
| DE | 102015110467 A1 | * | 1/2016 | ........... H01H 1/0036 |
| TW | I229430 B | | 3/2005 | |

OTHER PUBLICATIONS

Analog Devices, Inc., ADGM1304 Datasheet "0 Hz/dc to 14 GHz, Single-Pole, Four-Throw MEMS Switch with Integrated Driver," Feb. 2021, in 34 pages.

*Primary Examiner* — Dharti H Patel
(74) *Attorney, Agent, or Firm* — Knobbe, Martens, Olson & Bear, LLP

(57) ABSTRACT

Electrical overstress protection of microelectromechanical systems (MEMS) are disclosed herein. In certain embodiments, a MEMS radio frequency system includes a MEMS device electrically connected along a radio frequency signal path that handles a radio frequency signal, and an electrical overstress protection circuit in shunt with the radio frequency signal path and operable to protect the MEMS device from an electrical overstress event, such as an electrostatic discharge (ESD) event received on the radio frequency signal path. The electrical overstress protection circuit includes a metal conductor configured to resonate about at a fundamental frequency of the radio frequency signal.

20 Claims, 6 Drawing Sheets

(56) References Cited

U.S. PATENT DOCUMENTS

| | | |
|---|---|---|
| 10,033,179 B2 * | 7/2018 | Fitzgerald ................ H02H 9/04 |
| 10,158,029 B2 | 12/2018 | Parthasarathy et al. |
| 10,177,566 B2 | 1/2019 | Zhao et al. |
| 10,218,397 B1 * | 2/2019 | Gundrum ............... B81B 7/0048 |
| 10,404,059 B2 | 9/2019 | Salcedo et al. |
| 10,529,518 B2 | 1/2020 | Fitzgerald et al. |
| 10,594,357 B2 | 3/2020 | Tombak et al. |
| 10,865,101 B2 | 12/2020 | Mason et al. |
| 2004/0113713 A1 * | 6/2004 | Zipper ................. H01H 1/0036 333/105 |
| 2016/0006241 A1 * | 1/2016 | Fitzgerald .......... H01H 59/0009 361/13 |
| 2018/0315748 A1 | 11/2018 | Gaddi et al. |
| 2020/0350875 A1 | 11/2020 | Parthasarathy et al. |

\* cited by examiner

ELECTRICAL OVERSTRESS PROTECTION OF MICROELECTROMECHANICAL SYSTEMS

FIELD OF THE DISCLOSURE

Embodiments of the invention relate to electronic systems, and more particularly, to electrical overstress protection of microelectromechanical systems (MEMS).

BACKGROUND

Electronic components can be exposed to electrical overstress, or an electrical signaling event of a relatively short duration having rapidly changing voltage and high power. Electrical overstress events include electrostatic discharge (ESD) events, such as those arising from the abrupt release of charge from an object or person to an electronic circuit. Electrical overstress events can damage electronic components due to overvoltage conditions and/or high levels of power dissipation over relatively small areas. High power dissipation can increase temperature and lead to component damage or destruction.

SUMMARY OF THE DISCLOSURE

Electrical overstress protection of microelectromechanical systems (MEMS) are disclosed herein. In certain embodiments, a MEMS radio frequency system includes a MEMS device electrically connected along a radio frequency signal path that handles a radio frequency signal, and an electrical overstress protection circuit in shunt with the radio frequency signal path and operable to protect the MEMS device from an electrical overstress event, such as an electrostatic discharge (ESD) event received on the radio frequency signal path. The electrical overstress protection circuit includes a metal conductor configured to resonate about at a fundamental frequency of the radio frequency signal.

In one aspect, a microelectromechanical systems (MEMS) radio frequency system is provided. The MEMS radio frequency system includes a MEMS device electrically connected along a radio frequency signal path configured to handle a radio frequency signal, and an electrical overstress protection circuit in shunt with the radio frequency signal path and configured to protect the MEMS device from an electrical overstress event received on the radio frequency signal path, the electrical overstress protection circuit including a metal conductor configured to resonate about at a fundamental frequency of the radio frequency signal.

In another aspect, a radio frequency module is provided. The radio frequency module includes a module substrate, a carrier substrate attached to the module substrate, a MEMS die attached to the carrier substrate an including a MEMS device electrically connected along a radio frequency signal path that is configured to handle a radio frequency signal, and an electrical overstress protection circuit in shunt with the radio frequency signal path and configured to protect the MEMS device from an electrical overstress event received on the radio frequency signal path. The electrical overstress protection circuit includes a metal conductor having a resonant frequency about equal to a fundamental frequency of the radio frequency signal.

In another aspect, a method of overstress protection of microelectromechanical systems (MEMS) is provided. The method includes providing a radio frequency signal along a radio frequency signal path through a MEMS device, and protecting the MEMS device from an electrical overstress event using an electrical overstress protection circuit in shunt with the radio frequency signal path, the electrical overstress protection circuit including a metal conductor that resonates about at a fundamental frequency of the radio frequency signal.

DETAILED DESCRIPTION OF EMBODIMENTS

Figure 1A:
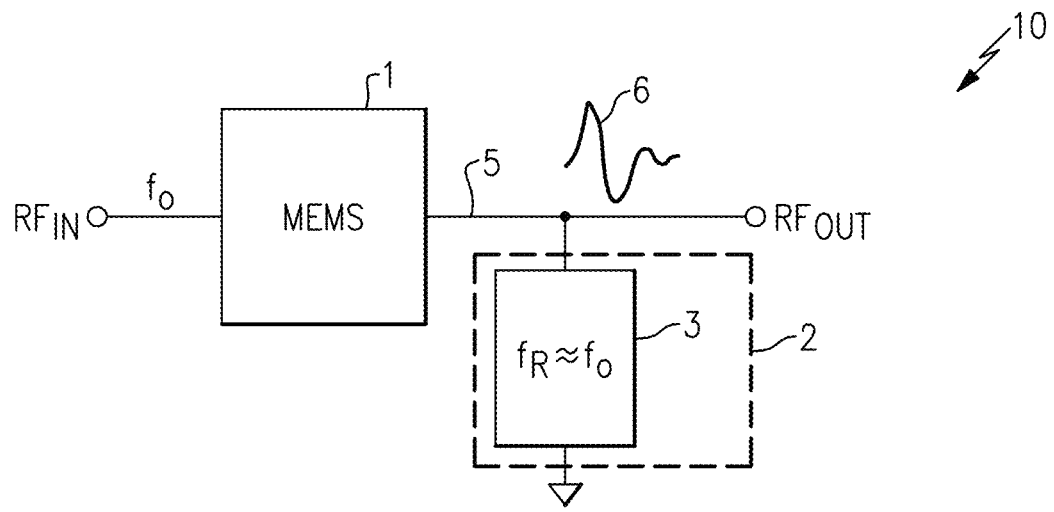
FIG. 1A is a schematic diagram of a MEMS radio frequency system with electrical overstress protection according to one embodiment.

The following detailed description of embodiments presents various descriptions of specific embodiments of the invention. However, the invention can be embodied in a multitude of different ways. In this description, reference is made to the drawings where like reference numerals may indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

To help guarantee that an electronic system is reliable, manufacturers can test the electronic system under defined stress conditions, which can be described by standards set by various organizations, such as the Joint Electronic Device Engineering Council (JEDEC), the International Electrotechnical Commission (IEC), and the Automotive Engineering Council (AEC). The standards can cover a wide multitude of electrical overstress (EOS) events, including electrostatic discharge (ESD) events.

Electrical overstress protection of microelectromechanical systems (MEMS) are disclosed herein. In certain embodiments, a MEMS radio frequency system includes a MEMS device electrically connected along a radio frequency signal path that handles a radio frequency signal, and an electrical overstress protection circuit in shunt with the radio frequency signal path and operable to protect the MEMS device from an electrical overstress event, such as an electrostatic discharge (ESD) event received on the radio frequency signal path. The electrical overstress protection circuit includes a metal conductor configured to resonate about at a fundamental frequency of the radio frequency signal.

By implementing the MEMS radio frequency system in this manner, robust protection of the MEMS device is provided with little to no impact on radio frequency signaling performance. For example, inclusion of the metal conductor for electrical overstress protection can provide low insertion loss, low parasitic loading, and/or little to no degradation to the radio frequency signal propagating along the radio frequency signal path. For example, the MEMS radio frequency system can exhibit good third-order intercept point (IP3), low insertion loss (IL), and/or high linearity while providing robust electrical overstress protection, for instance, human body model (HBM) rating of 1 kV or more. Furthermore, the metal conductor can be easily integrated into the MEMS radio frequency system with low cost, for instance, on a circuit board (for instance, a laminate), in a packaging or carrier substrate, and/or on-chip.

The protection schemes herein can be applied to MEMS radio frequency systems used in a wide variety of applications including, but not limited to, cellular, microwave, very small aperture terminal (VSAT), automotive, Internet of Things (IoT), radar, test equipment, and/or network backend applications. Such MEMS radio frequency systems can handle RF signals of a variety of frequencies, including not only those used for 3G, 4G, 5G frequency range one (FR1), WiMAX, LTE, and Advanced LTE communications, but also to higher frequencies, such as those in the X band (about 7 GHz to 12 GHz), the $K_u$ band (about 12 GHz to 18 GHz), the K band (about 18 GHz to 27 GHz), the $K_a$ band (about 27 GHz to 40 GHz), the V band (about 40 GHz to 75 GHz), and/or the W band (about 75 GHz to 110 GHz). Accordingly, the teachings herein are applicable to a wide variety of RF communication systems, including millimeter communication systems such as 5G frequency range two (FR2) systems.

FIG. 1A is a schematic diagram of a MEMS radio frequency system 10 with electrical overstress protection according to one embodiment.

The MEMS radio frequency system 10 includes at least one MEMS device 1 electrically connected along a radio frequency signal path 5 from a radio frequency input $RF_{IN}$ to a radio frequency output $RF_{OUT}$. The MEMS radio frequency system 10 further includes an electrical overstress protection circuit 2 that protects the MEMS device 1 from electrical overstress.

With continuing reference to FIG. 1A, the radio frequency input $RF_{IN}$ receives a radio frequency signal having a fundamental frequency $f_o$. The MEMS device 1 processes the radio frequency signal to generate a radio frequency output signal on the radio frequency output $RF_{OUT}$. The MEMS device 1 can be implemented in a wide variety of ways. For example, the MEMS device can include one or more MEMS switches, one or more MEMS resonators, one or more MEMS filters, and/or other MEMS component(s).

As shown in FIG. 1A, the electrical overstress protection circuit 2 is in shunt with the radio frequency signal path 5 (connected between the radio frequency output $RF_{OUT}$ and ground, in this example). The electrical overstress protection circuit 2 protect the MEMS device 1 from an electrical overstress event 6 received on the radio frequency signal path 5.

The electrical overstress protection circuit 2 includes a metal conductor 3 having a resonant frequency $f_R$ that is about equal to the fundamental frequency $f_o$ of the radio frequency signal, thus providing high impedance to the radio frequency signal as it propagates along the radio frequency signal path 5. In one embodiment, the resonance of the metal conductor 3 is within 20% of the fundamental frequency $f_o$ of the radio frequency signal, or more particularly within 5% of the fundamental frequency $f_o$.

However, the metal conductor 3 presents low impedance to the electrical overstress event 6, which includes frequency components much less than that of the fundamental frequency $f_o$ of the radio frequency signal. For example, electrical overstress events can be associated with frequency components an order of magnitude or more than radio frequency signals of certain frequencies. Radio frequency signals are in the frequency range of 30 Hz to 300 GHz, or more particularly from 410 MHz to 52.6 GHz for cellular radio frequency signals. In one embodiment, the fundamental frequency $f_o$ is at least 1 GHz, or more particular, at least 3.5 GHz.

Thus, the metal conductor 3 presents a high impedance to the radio frequency signal and a low impedance to the electrical overstress event 6, which can be an ESD event or other high stress electrical event capable of damaging the MEMS device 1 if not suitably discharged. In one example, MEMS radio frequency system 10 is deployed in an automotive application, and the electrical overstress event 6 corresponds to conditions arising from a lighting strike to the automobile. Accordingly, for a variety of electrical overstress events the electrical overstress protection circuit 2 provides low insertion loss to radio frequency signals while serving to shunt the charge associated with the electrical overstress event 2 to ground or other suitable discharge node.

In certain embodiments, the electrical overstress protection circuit 2 provides less than 0.1 dB of insertion loss at the fundamental frequency $f_o$ of the radio frequency signal, IP3 of 90 dBm or more, and/or 40 dBm or more of power handling capability.

The metal conductor 3 can be implemented in a variety of ways. In a first example, the metal conductor 3 corresponds to an inductor. In a second example, the metal conductor 3 corresponds to a quarter wave metal stub. Advantageously, the metal conductor 3 can be readily implemented to accommodate a radio frequency signal of a particular fundamental frequency. For example, in an implementation in which the metal conductor 3 corresponds to an inductor, an inductance value of the inductor can be chosen to provide suitable electrical overstress protection to a MEMS radio frequency system operating using a particular signal frequency.

Figure 1B:
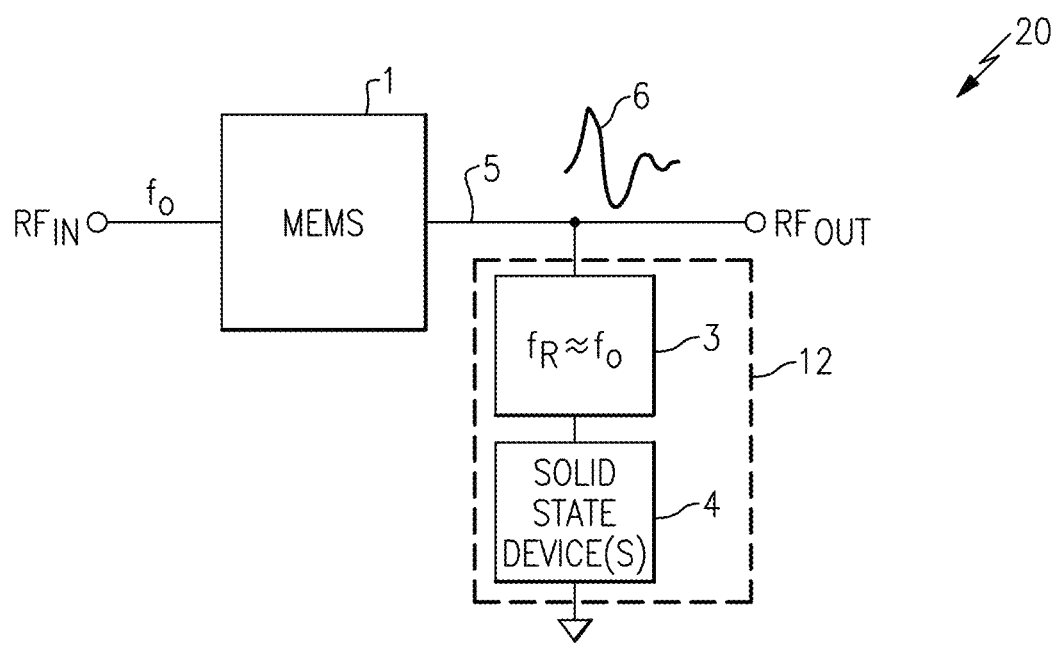
FIG. 1B is a schematic diagram of a MEMS radio frequency system with electrical overstress protection according to another embodiment.

FIG. 1B is a schematic diagram of a MEMS radio frequency system 20 with electrical overstress protection according to another embodiment.

The MEMS radio frequency system 20 of FIG. 1B is similar to the MEMS radio frequency system 10 of FIG. 1A, except that the MEMS radio frequency system 20 includes an electrical overstress protection circuit 12 that further includes one or more solid state devices 4 in series with the metal conductor 3. Examples of such solid state devices 3 include, but are not limited to, diode(s) (including, but not limited to, transient-voltage-suppression or TVS diodes), thyristor(s), transistor(s), and/or other components.

Including one or more solid state devices 4 in series with the metal conductor 3 can aid in tuning protection characteristics of the electrical overstress protection circuit 12 such as trigger voltage and/or holding voltage. In certain implementations, the one or more solid state devices 3 block DC, while the metal conductor 3 serves to block at the fundamental frequency $f_o$ of the radio frequency signal.

In certain embodiments, one or more parallel components are included in addition to or as an alternative to one or more components in series with the metal conductor 3. Such parallel components can include, but are not limited to, other electrical overstress components and/or capacitors that operate in combination with the metal conductor 3 to perform a variety of functions, including impedance matching and/or impedance transformation.

Figure 2A:
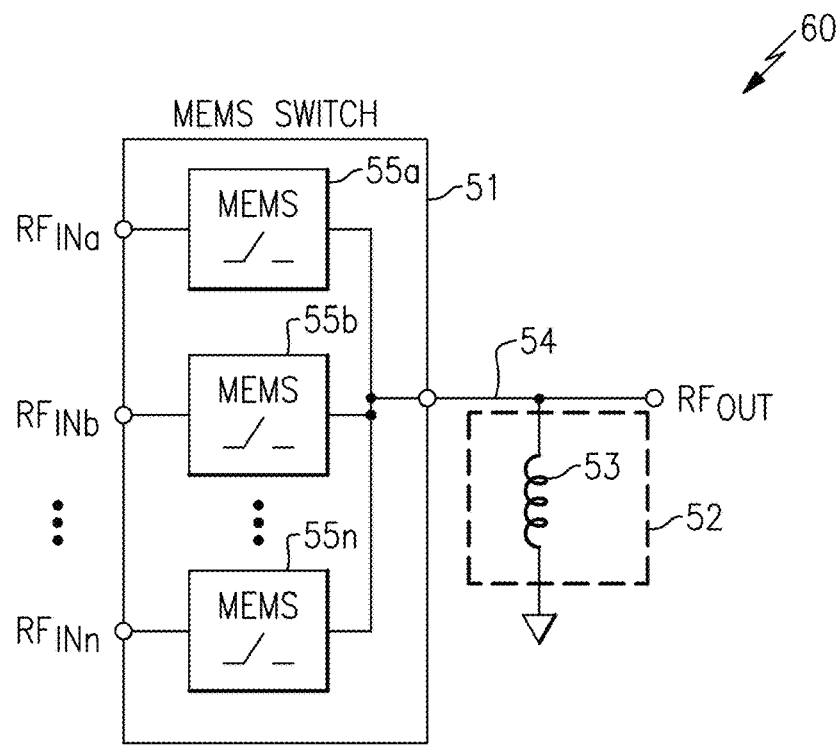
FIG. 2A is a schematic diagram of a MEMS radio frequency system with electrical overstress protection according to another embodiment.

FIG. 2A is a schematic diagram of a MEMS radio frequency system 60 with electrical overstress protection according to another embodiment. The MEMS radio frequency system 60 includes a MEMS switch die 51 and an electrical overstress protection circuit 52.

As shown in FIG. 2A, the MEMS switch die 51 is connected along a radio frequency signal path 54, and the electrical overstress protection circuit 52 is electrically connected in shunt to the radio frequency signal path 54.

In the illustrated embodiment, the MEMS switch die 51 is implemented as a single pole multi throw (SPnT) switch that selects a radio frequency signal received from a radio frequency input ($RF_{INa}$, $RF_{INb}$, ... $RF_{INn}$) as a radio frequency output $RF_{OUT}$. The MEMS switch die 51 includes MEMS switch components 55a, 55b, ... 55n for connecting between the radio frequency inputs $RF_{INa}$, $RF_{INb}$, ... $RF_{INn}$, respectively, and the radio frequency output $RF_{OUT}$. Each of the MEMS switch components 55a, 55b, ... 55n is individually controllable, for instance, using a controller die (for instance, the controller die 104 shown in FIGS. 3A-3C).

Although shown as including three throws, the MEMS switch die 51 can include more or fewer throws. Additionally or alternatively, the MEMS switch die 51 can include multiple poles.

In the illustrated embodiment, the electrical overstress protection circuit 52 includes an inductor 53 connected between the radio frequency output $RF_{OUT}$ and ground and having a resonant frequency about equal to that of the radio frequency signal propagating along the radio frequency signal path 54.

Figure 3A:
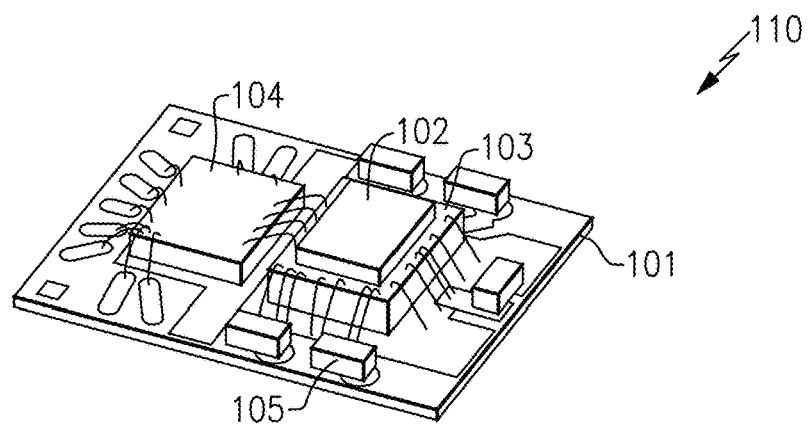
FIG. 3A is a schematic diagram of a MEMS radio frequency module with electrical overstress protection according to one embodiment.
Figure 3B:
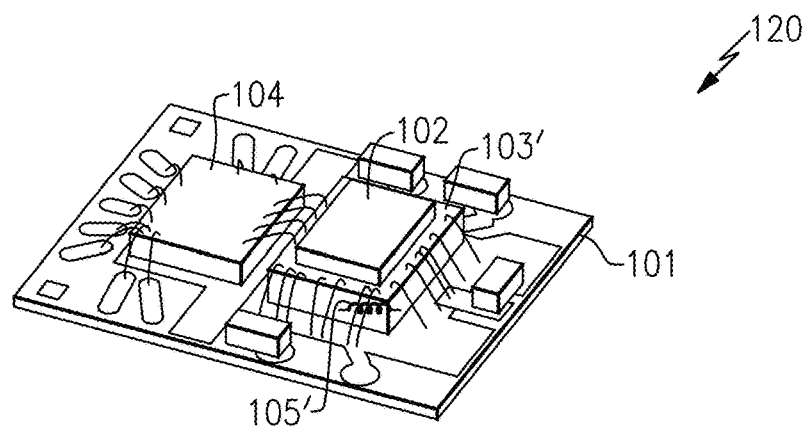
FIG. 3B is a schematic diagram of a MEMS radio frequency module with electrical overstress protection according to another embodiment.
Figure 3C:
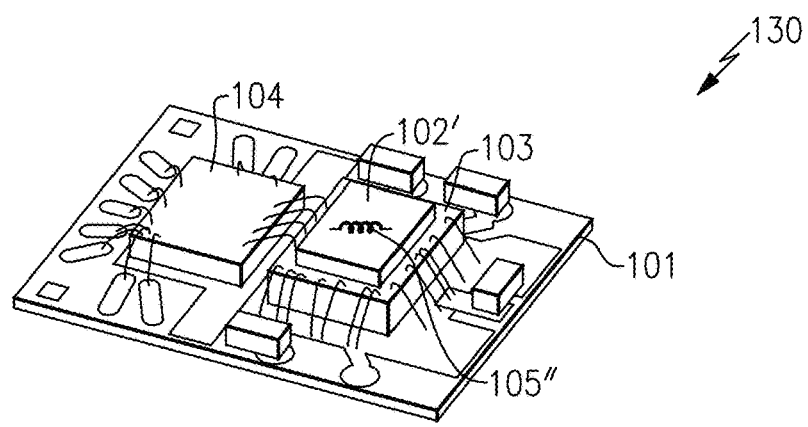
FIG. 3C is a schematic diagram of a MEMS radio frequency module with electrical overstress protection according to another embodiment.

Although shown as being external to the MEMS switch die 51, in another embodiment the inductor 53 is implemented on the MEMS switch die 51 (see, for example, the embodiment of FIG. 3C).

Figure 2B:
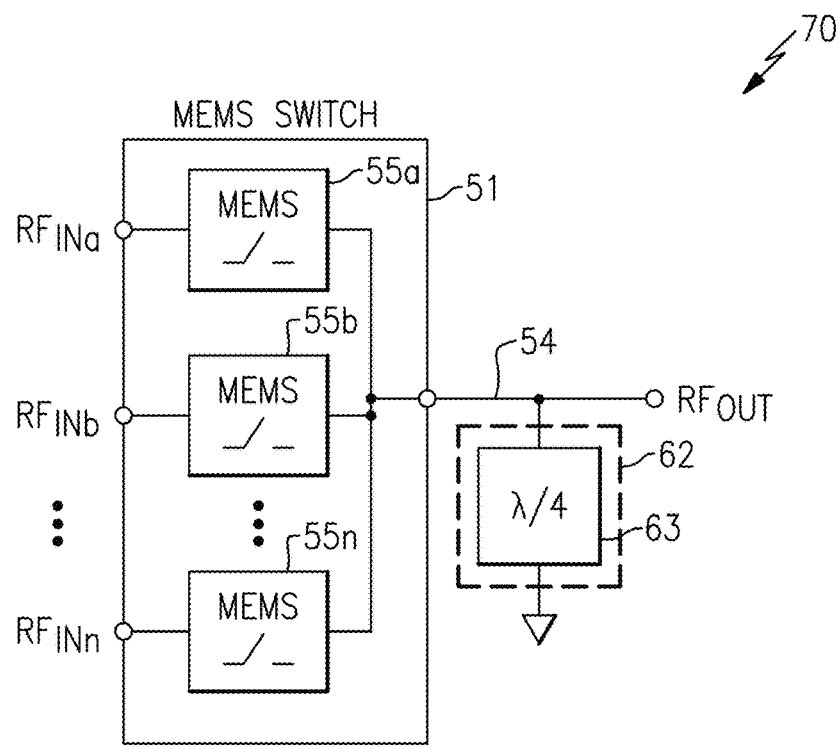
FIG. 2B is a schematic diagram of a MEMS radio frequency system with electrical overstress protection according to another embodiment.

FIG. 2B is a schematic diagram of a MEMS radio frequency system 70 with electrical overstress protection according to another embodiment.

The MEMS radio frequency system 70 of FIG. 2B is similar to the MEMS radio frequency system 60 of FIG. 2A, except that the MEMS radio frequency system 70 includes an electrical overstress protection circuit 62 that includes a quarter wave stub 63 connected between the radio frequency signal path 54 and ground.

The quarter wave stub 63 includes metallization having a length about equal to one-fourth the wavelength of the radio frequency signal propagating along the radio frequency signal path 54. In one embodiment, the quarter wave stub 63 has a length within 10% of the wavelength of the radio frequency signal.

FIG. 3A is a schematic diagram of a MEMS radio frequency module 110 with electrical overstress protection according to one embodiment. The MEMS radio frequency module 110 includes a module substrate 101 (for example, a laminate or other circuit board), a MEMS die 102, a carrier substrate 103, a controller die 104, and a surface mount inductor 105.

In the illustrated embodiment, the module substrate 101 includes a variety of components attached thereto, including surface mount devices (SMDs) such as the surface mount inductor 105. Additionally, the controller die 104 is attached to the module substrate 101. Furthermore, the carrier substrate 103 is attached to the module substrate 101 adjacent the controller die 104, and the MEMS die 102 is attached to the carrier substrate 103.

The surface mount inductor 105 is in shunt to a radio frequency signal path through the MEMS die 102, and serves to protect one or more MEMS devices fabricated on the MEMS die 102 from damage arising from electrical overstress. Additionally, the controller die 104 generates control signals, such as switch activation/deactivation signals, for controlling the MEMS die 102. In this example, wirebonds are used to carry the control signals from the controller die 104 to the MEMS die 102. In certain implementations, the controller die 104 is fabricated using a semiconductor processing technology (for instance, a silicon fabrication technology), while the MEMS die 102 is fabricated using a MEMS fabrication technology.

In the illustrated embodiment, the metal conductor used to protect MEMS device(s) from electrical overstress is implemented as the surface mount inductor 105 on the module substrate 101.

FIG. 3B is a schematic diagram of a MEMS radio frequency module 120 with electrical overstress protection according to another embodiment.

The MEMS radio frequency module 120 of FIG. 3B is similar to the MEMS radio frequency module 110 of FIG. 3A, except that the MEMS radio frequency module 120 omits the surface mount inductor 105 in favor of including an inductor 105' formed on the carrier substrate 103'. The inductor 105' can be formed in a wide variety of ways including, but not limited to, using metallization associated with routing layers of the carrier substrate 103'. The inductor 105' serves as an electrical overstress protection circuit for protecting one or more MEMS devices formed on the MEMS die 102 in accordance with the teachings herein.

FIG. 3C is a schematic diagram of a MEMS radio frequency module 130 with electrical overstress protection according to another embodiment.

The MEMS radio frequency module 130 of FIG. 3C is similar to the MEMS radio frequency module 110 of FIG. 3A, except that the MEMS radio frequency module 130 omits the surface mount inductor 105 in favor of including an inductor 105" formed on the MEMS die 102'. The inductor 105" can be formed in a wide variety of ways including, but not limited to, using metallization associated with metal layers of the MEMS die 102'. The inductor 105" serves as an electrical overstress protection circuit for protecting one or more MEMS devices formed on the MEMS die 102' in accordance with the teachings herein.

Figure 4:
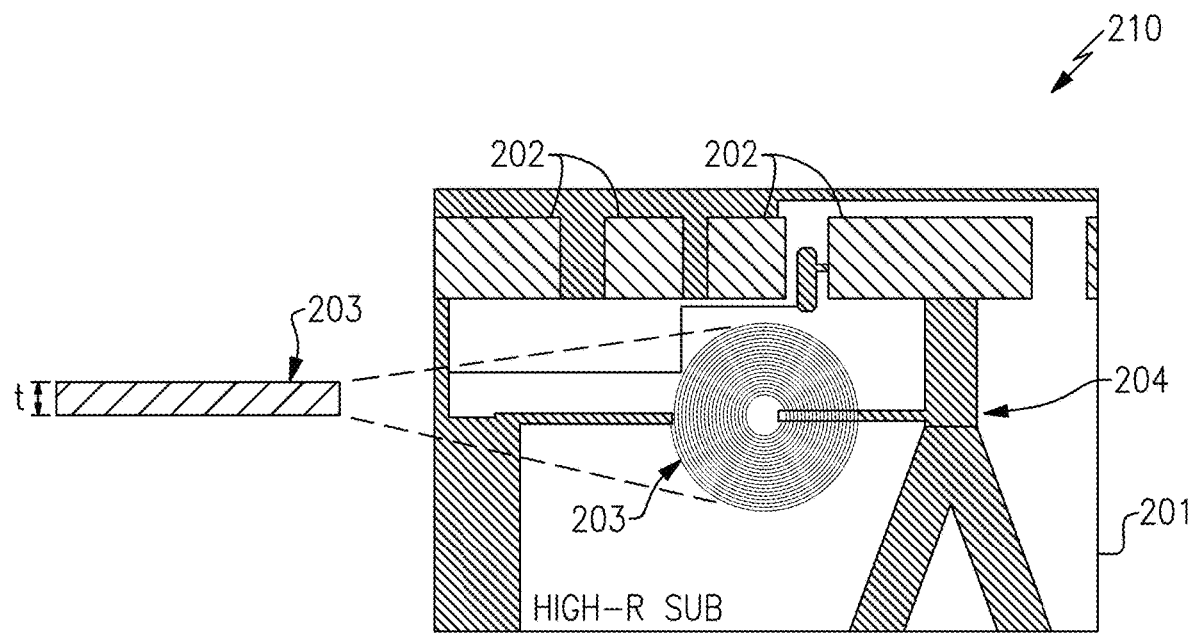
FIG. 4 is a schematic diagram of a MEMS die with electrical overstress protection according to one embodiment.

FIG. 4 is a schematic diagram of a MEMS die 210 with electrical overstress protection according to one embodiment. The MEMS die 210 includes a high resistivity substrate 201 over which metal pads 202 (for serving as input and/or output terminals to the MEMS die 210), an inductor 203, and a MEMS device 204 are formed.

In the illustrated embodiment, the inductor 203 is formed using a spiral metal structure having a thickness t. In certain implementations, the thickness t of the inductor is at least 0.5 µm, or more particularly at least 1 µm. The inductor 203 serves to provide electrical overstress protection to the MEMS device 204 in accordance with the teachings herein.

Although a spiral inductor is depicted, a wide range of inductor shapes are possible, including, but not limited to, square, rectangular, circular, elliptical, hexagonal, and/or octagonal.

The high resistivity substrate 201 has a high resistivity, for example, at least 1 kΩ/cm, or more particularly at least 5 kΩ/cm. The high resistivity substrate 201 can be formed of various materials including, but not limited to, silicon, glass, quartz, or sapphire.

By using thick metallization for the inductor 203 or by forming the inductor 203 over the high resistivity (HIGH-R) substrate 201 (or preferably both), the inductor 203 achieves high quality factor (Q factor). Providing high quality factor for the inductor 203 helps achieve low insertion loss and/or high linearity. Other techniques for improved Q factor include, but are not limited to, providing trenches in a portion of a substrate beneath the inductor (with the trenches filled with a dielectric or left unfilled), providing an air cavity between the inductor and the substrate, plating the inductor with a high conductivity metal, and/or providing shielding between the inductor and the substrate.

Although FIGS. 3A-4 are depicted in the context of an inductor providing electrical overstress protection, other resonant metal conductors (for instance, quarter wave stubs) can provide protection in accordance with the teachings. Such other resonant metal structures can be placed in a variety of locations, including on a circuit board, on a die's carrier substrate, or on a MEMS die alongside MEMS components.

Figure 5:
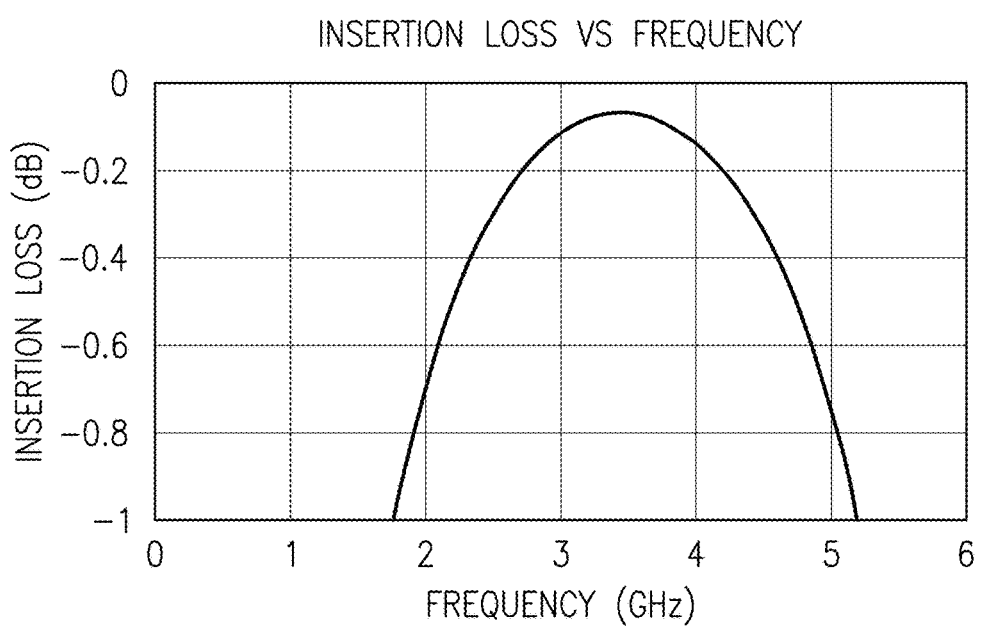
FIG. 5 is a graph of insertion loss versus frequency for a MEMS device protected by an electrical overstress protection circuit in accordance with one embodiment.

FIG. 5 is a graph of insertion loss versus frequency for a MEMS device protected by an electrical overstress protection circuit in accordance with one embodiment. The graph corresponds to an example in which a single pole four throw (SP4T) MEMS switch handling a radio frequency signal of 3.5 GHz is protected from electrical overstress using an inductor connected in shunt to ground.

As shown in the example of FIG. 5, less than 0.1 dB of insertion loss is provided at the fundamental frequency of 3.5 GHz. The inductor advantageously serves to provide narrow band ESD protection with ultra-low loss and high linearity.

Figure 6A:
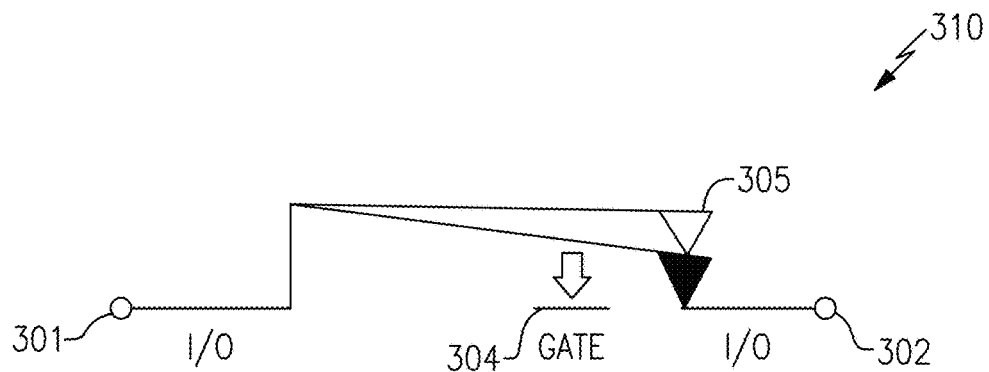
FIG. 6A is a schematic diagram of a MEMS switch according to one embodiment.

FIG. 6A is a schematic diagram of a MEMS switch 310 according to one embodiment. The MEMS switch 310 includes a first input/output (I/O) terminal 301, a second I/O terminal 302, a gate 304 (also referred to herein as a control terminal), and a MEMS cantilever 305. By controlling the voltage of the gate 304 relative to the first I/O terminal 301, the MEMS cantilever 305 can be physically moved to selectively contact the second I/O terminal 302. Thus, the MEMS switch 310 can be transitioned between an opened state or a closed state by controlling the voltage applied to the gate 304. Such gate control can be performed by any suitable control circuit, for instance, a gate control circuit formed on a semiconductor controller die (for example, controller die 104 of FIGS. 3A-3C).

The MEMS switch 310 of FIG. 6A illustrates one example of a MEMS device that can be protected with the electrical overstress protection circuits disclosed herein. However, the teachings herein can be used to protect other types of MEMS devices.

Figure 6B:
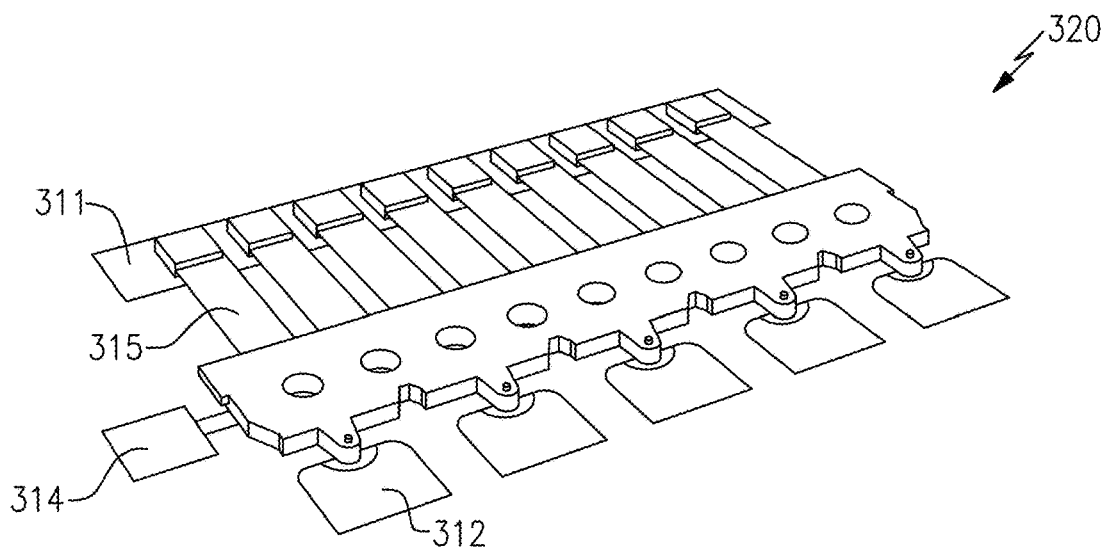
FIG. 6B is a perspective view of one embodiment of a MEMS switch.

FIG. 6B is a perspective view of one embodiment of a MEMS switch 320. The MEMS switch 320 a first I/O terminal 311, a second I/O terminal 312 (implemented in this example as five metal contacts in parallel for reduced resistance and/or higher power handling capability when the MEMS switch 320 is in the closed state), a gate 314, and a cantilever 315 (implemented in this example as nine parallel cantilever structures for improved current handling in the closed state).

The MEMS switch 320 illustrates one embodiment of a physical implementation of the MEMS switch 310 schematically depicted in FIG. 6A. However, the MEMS switch 310 of FIG. 6A can be implemented in other ways. For example, although a MEMS switch using Ohmic contact is shown, in another embodiment, a capacitive switch is used.

Figure 6C:
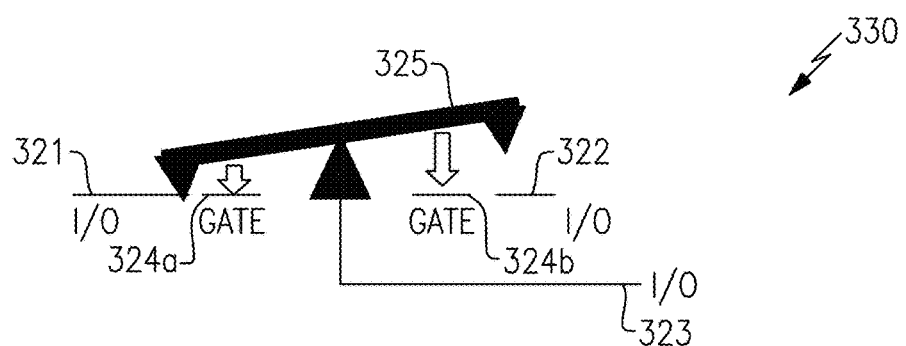
FIG. 6C is a schematic diagram of a MEMS switch according to another embodiment.

FIG. 6C is a schematic diagram of a MEMS switch 330 according to another embodiment. The MEMS switch 330 includes a first I/O terminal 301, a second I/O terminal 302, a third I/O terminal 303, a first gate 324a, a second gate 324b, and a MEMS lever 325. By controlling a voltage of the first gate 324a and a voltage of the second gate 324b relative to the third I/O terminal 323, the MEMS lever 325 can be moved to contact the first I/O terminal 301 or the second I/O terminal 302. The MEMS switch 330 can be used in a wide variety of ways including, but not limited to, as a transmit/receive (T/R) switch in which the first I/O terminal 321 serves as a transmit terminal (for example, for connecting to an output of a power amplifier), the second I/O terminal 322 serves as a receive terminal (for example, for connecting to an input of a low noise amplifier), and the third I/O terminal 323 serves as an antenna terminal for connecting to an antenna.

The MEMS switch 330 of FIG. 6C illustrates another example of a MEMS device that can be protected with the electrical overstress protection circuits disclosed herein. However, the teachings herein can be used to protect other types of MEMS devices.

Figure 7A:
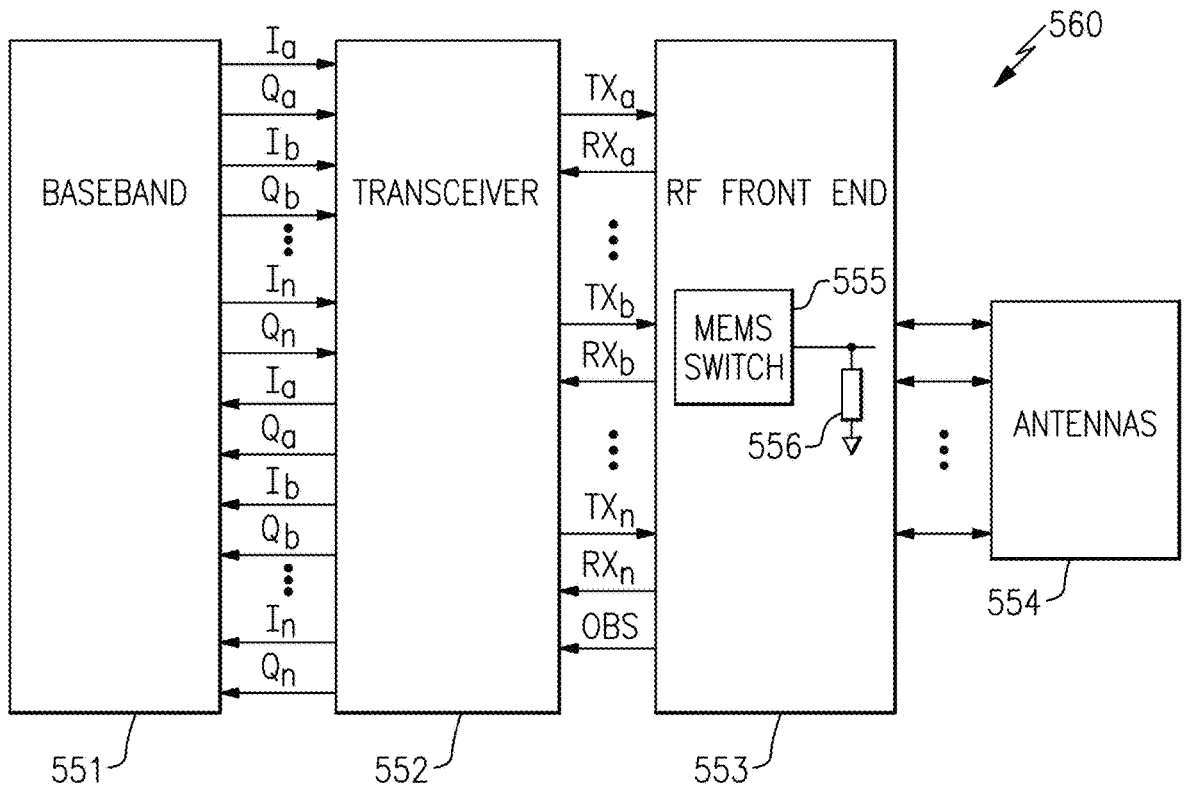
FIG. 7A is a schematic diagram of a radio frequency communication system according to one embodiment.

FIG. 7A is a schematic diagram of a radio frequency communication system 560 according to one embodiment. The radio frequency communication system 560 includes a baseband processor 551, a transceiver 552, a radio frequency front end 553, and antennas 554.

The baseband processor 551 generates in-phase (I) and quadrature-phase (Q) transmit data for transmitters of the transceiver 552. Additionally, the I and Q transmit data is processed by the transmitters of the transceiver 552 to generate radio frequency transmits signals $TX_a$, $TX_b$, . . . $TX_n$. One or more of the radio frequency transmit signals $TX_a$, $TX_b$, . . . $TX_n$, can be transmitted using the antennas 554. In certain implementations, the antennas 554 correspond to an antenna array.

The transmitters of the transceiver 552 can serve to provide a wide variety of functions, including digital-to-analog data conversion, filtering, gain control, and frequency upconversion to radio frequency (for example, using a mixer controlled by a local oscillator).

The antennas 554 are also coupled to the radio frequency front end 553 for purposes of receiving radio frequency signals. As shown in FIG. 7A, the radio frequency front end 553 provides the transceiver 552 with radio frequency receive signals $RX_a$, $RX_b$, . . . $RX_n$. Additionally, the receivers of the transceiver 552 process the radio frequency receive signals to generate I and Q receive data for the baseband processor 551.

The receivers of the transceiver 552 can serve to provide a wide variety of functions, including frequency downconversion to intermediate frequency (IF) or baseband (for example, using a mixer controlled by a local oscillator), filtering, gain control, and analog-to-digital conversion.

As shown in FIG. 7A, the radio frequency front end 553 also provides an observation signal OBS for processing by an observation receiver of the transceiver 552. For example, the output transmit power (for instance, from a power amplifier) can be sensed in the radio frequency front end 553 using a directional coupler or other suitable structure, and provided to the transceiver 552 as the observation signal OBS. The observation signal OBS can be processed by an observation receiver of the transceiver 552 to aid in providing transmit power control and/or digital pre-distortion (DPD).

In certain implementations, the radio frequency communication system 560 controls the amplitude and phase of radio frequency signals provided to the antennas 554 to perform beamforming. Thus, the radio frequency communication system 560 can correspond to a phased array communication system.

In the illustrated embodiment, the radio frequency front end 553 includes a MEMS switch 555 that is protected from electrical overstress (for example, ESD events received on the antennas 554) by a metal conductor 556 implemented in accordance with the teachings herein. Although the radio frequency communication system 560 of FIG. 7A illustrates one embodiment of a radio frequency system including MEMS devices, the teachings herein are applicable to a wide variety of radio frequency systems.

Figure 7B:
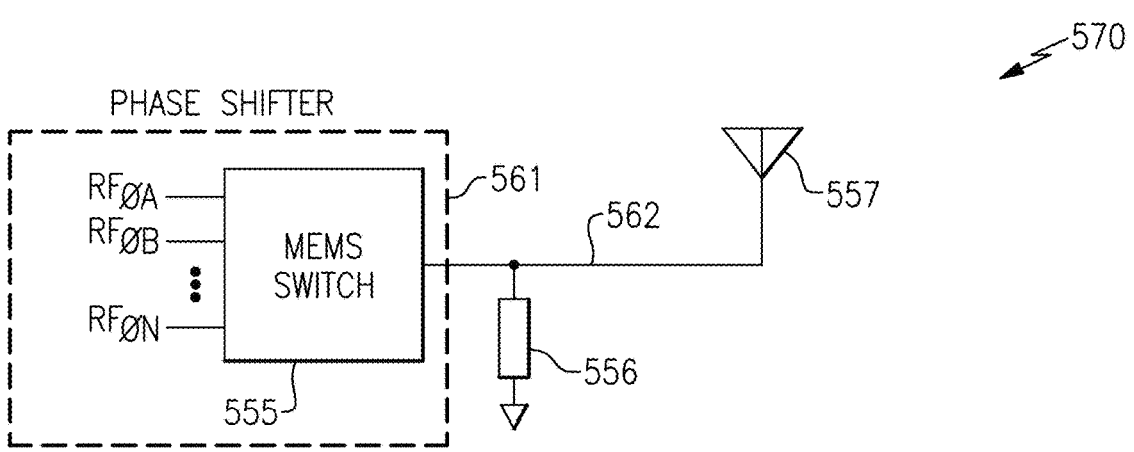
FIG. 7B is a schematic diagram of one embodiment of a portion of the radio frequency communication system of FIG. 7A.

FIG. 7B is a schematic diagram of one embodiment of a portion 570 of the radio frequency communication system of 560 FIG. 7A. In the illustrated embodiment, a phase shifter 561 includes the MEMS switch 555 for selecting amongst various radio frequency signals $RF_{\varphi A}$, $RF_{\varphi B}$, ... $RF_{\varphi N}$ of common frequency but different phases. Additionally, an output terminal of the MEMS switch 555 is directly connected to an antenna 557 along a radio frequency signal path 562. Additionally, the metal conductor 556 is connected between the radio frequency signal path 562 and ground.

In this example, the MEMS switch 555 is directly connected to the antenna 557, and thus is particularly susceptible to ESD events and/or other electrical overstress. For example, the MEMS switch 555 is included as part of the phase shifter 561, which can be used for providing a phase adjustment desired for beamforming. In comparison, a MEMS switch can be less susceptible to electrical overstress in applications with a cavity filter and/or other components are interposed between the MEMS switch and an antenna.

Thus, the teachings herein can be particularly advantageous for configurations in which a MEMS device is directly connected to an antenna.

However, the teachings herein are also applicable to implementations in which one or more components are interposed between a MEMS device and an antenna. In one example, the MEMS switch 555 is used as part of a switchable filter, and the metal conductor 556 serves to protect the MEMS switch 555 from electrical overstress arising during handling, during assembly, and/or after manufacture.

Applications

Devices employing the above described schemes can be implemented into various electronic devices. Examples of electronic devices include, but are not limited to, consumer electronic products, electronic test equipment, communication infrastructure, etc.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments. Accordingly, the scope of the present invention is defined only by reference to the appended claims.

Although the claims presented here are in single dependency format for filing at the USPTO, it is to be understood that any claim may depend on any preceding claim of the same type except when that is clearly not technically feasible.

What is claimed is:

1. A microelectromechanical systems (MEMS) radio frequency system comprising:
    a MEMS device electrically connected along a radio frequency signal path configured to handle a radio frequency signal; and
    an electrical overstress protection circuit connected between the radio frequency signal path and ground and configured to protect the MEMS device from an electrical overstress event received on the radio frequency signal path, the electrical overstress protection circuit including a metal conductor configured to resonate about at a fundamental frequency of the radio frequency signal.

2. The radio frequency system of claim 1, wherein the metal conductor is an inductor.

3. The radio frequency system of claim 2, further comprising a MEMS die including the MEMS device.

4. The radio frequency system of claim 3, wherein the inductor is fabricated on the MEMS die.

5. The radio frequency system of claim 4, wherein the MEMS die includes a substrate with at a resistivity of at least 1 kilo-Ohm per centimeter, and the inductor is fabricated from a metal layer that is at least 0.5 μm thick.

6. The radio frequency system of claim 3, wherein the MEMS die is attached to a carrier substrate, and the inductor is formed on the carrier substrate.

7. The radio frequency system of claim 3, wherein the MEMS die is attached to a carrier substrate that is attached to a circuit board, wherein the inductor is formed on the circuit board.

8. The radio frequency system of claim 1, wherein the metal conductor is a quarter wave stub having a length of about one quarter a wavelength of the radio frequency signal.

9. The radio frequency system of claim 1, further comprising an antenna directly connected to the MEMS device, the antenna susceptible to receiving an electrostatic discharge event.

10. The radio frequency system of claim 1, wherein the MEMS device is a MEMS switch.

11. The radio frequency system of claim 1, wherein the metal conductor is directly connected between the MEMS device and ground.

12. The radio frequency system of claim 1, wherein the electrical overstress protection circuit includes the metal conductor in series with at least one solid state device between the radio frequency signal path and ground.

13. The radio frequency system of claim 12, wherein the at least one solid state device is configured to provide blocking at DC.

14. A radio frequency module comprising:
a module substrate;
a carrier substrate attached to the module substrate;
a MEMS die attached to the carrier substrate, wherein the MEMS die includes a MEMS device electrically connected along a radio frequency signal path that is configured to handle a radio frequency signal; and
an electrical overstress protection circuit connected between the radio frequency signal path and ground and configured to protect the MEMS device from an electrical overstress event received on the radio frequency signal path, the electrical overstress protection circuit including a metal conductor having a resonant frequency about equal to a fundamental frequency of the radio frequency signal.

15. The radio frequency module of claim 14, wherein the metal conductor corresponds to an inductor formed on the module substrate.

16. The radio frequency module of claim 14, wherein the metal conductor corresponds to an inductor formed on the carrier substrate.

17. The radio frequency module of claim 14, wherein the metal conductor corresponds to an inductor formed on the MEMS die.

18. The radio frequency module of claim 14, wherein the MEMS die includes a high resistivity substrate of at least 1 kΩ/cm, wherein the inductor is formed from metallization over the high resistivity substrate, wherein the metallization is at least 0.5 μm thick.

19. A method of overstress protection of microelectromechanical systems (MEMS), the method comprising:
providing a radio frequency signal along a radio frequency signal path through a MEMS device; and
protecting the MEMS device from an electrical overstress event using an electrical overstress protection circuit connected between the radio frequency signal path and ground, the electrical overstress protection circuit including a metal conductor that resonates about at a fundamental frequency of the radio frequency signal.

20. The method of claim 19, wherein protecting the MEMS device from an electrical overstress event includes protecting a MEMS switch from an electrostatic discharge event received on an antenna that is directly connected to the MEMS switch.

\* \* \* \* \*